Jan. 6, 1931. J. C. BOYLAN Re. 17,917
DOOR OPERATING DEVICE FOR STOVES AND THE LIKE
Original Filed July 1, 1926
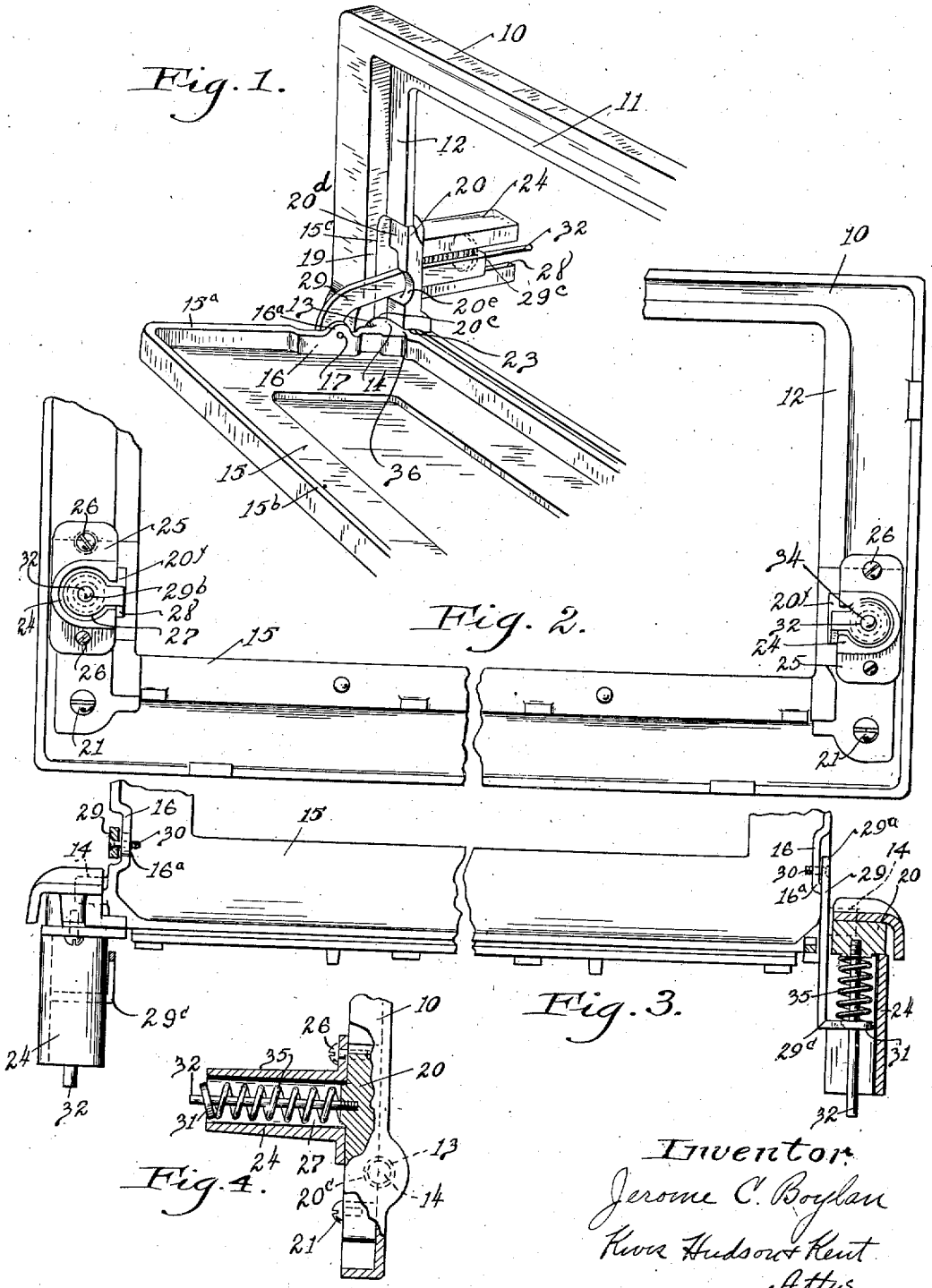
Inventor:
Jerome C. Boylan
Kuox Hudson & Kent
Attys.

Reissued Jan. 6, 1931

Re. 17,917

UNITED STATES PATENT OFFICE

JEROME C. BOYLAN, OF CLEVELAND HEIGHTS, OHIO

DOOR-OPERATING DEVICE FOR STOVES AND THE LIKE

Original No. 1,635,777, dated July 12, 1927, Serial No. 119,797, filed July 1, 1926. Application for reissue filed April 4, 1929. Serial No. 352,591.

My invention relates to an improvement in door operating devices and more particularly to the type of operating devices employed in connection with stove oven doors on the ordinary type of ranges.

An object of my invention is to provide a door operating device which when properly installed will not be seen when the oven door is in either open or closed position. It is a further object of my invention to construct this operating device in such a manner that it will serve partially as a bearing means for the pivoted door so as to thereby eliminate the use of the ordinary heavy hinges usually secured to the outside of the stove frame and which is more or less unsightly.

Another object of the invention is directed to a means for preventing the door from accidentally dropping open and a still further object is the provision of a means for checking the opening movement of the door beyond a predetermined point.

A still further object of my invention is to provide a door operating device which will be neat, small and inexpensive but at the same time very efficient, and a device which will be so located that the interior oven space will not be reduced.

As a further object of the device there is provided means for automatically closing the oven door and for maintaining it in its closed position until manually opened.

With the objects above indicated and other objects hereinafter explained in view, my invention consists in the construction and combination of elements hereinafter described and claimed.

Referring to the drawings:

Fig. 1 shows a perspective view of a portion of the frame of the stove and the oven door attached thereto with my hinge properly positioned;

Fig. 2 is a rear view of the same showing the manner in which the hinges are secured to the supporting frame;

Fig. 3 is a top plan view with the oven door shown in open position and having the hinge portion in section; and Fig. 4 is a segmentary sectional view through the hinge member showing the arrangement of the spring and the end of the pivoted arm.

In the drawings, 10 indicates the frame around the door opening of the lower door of a stove, not shown. This frame is provided with an upper and lower flange 11 and side flanges 12 which extend into the door opening and are of sufficient width to engage a portion of the door to thereby provide a tight joint and thus prevent the heat from escaping from within the oven.

At the lower portion of the frame 10 and upon the inner surface a recess 13 is provided which serves as a portion of a bearing adapted to receive the extension 14 formed upon the sides and at the lower ends of the door 15.

The door 15 is provided with flanges 15*a* and 15*b* which engage with the flanges 11 and 12 of the frame 10 when the door 15 is in closed position. An offset 16 is formed in the lower portion of the flanges 15*a* and this offset extends inwardly. The upper surface of the offset 16 is provided with a semicircular portion 16*a* and through this portion extends an opening 17.

A block or casting 20 is located within a cut away portion 15*c* of the frame 10 and is secured thereto by means of a bolt 21. This block or casting 20 is provided with a recess 20*c* at its lower portion which registers with the recess 13 in the frame 10 and they both thereby form a bearing for the extension 14 on the door 15 on the inner side of the frame 10.

The block or casting 20 is further provided with a portion 20*d* which fits within a recess 19 formed in the flanges 12. In fact the entire lower portion of the flange 12 is cut away to accommodate this block or casting 20. The portion 20*d* of the casting 20 is cut off at right angles to the vertical portions to form a flat surface 23 which acts as an abutment for the door 15 when in open position as indicated at 36. A recessed portion 20*e* is provided in the face of the block or casting 20 and is located so as to register with the portion 16*a* on the door 15. Adjacent this recessed portion 20*e* is a slot 20*f* which extends entirely through the block 20 the purpose of which will be hereinafter explained.

A housing 24 is secured to the block or casting 20 by means of bolts 26 which extend through openings provided in the integral flanges 25. The opening 27 extends entirely through the housing 24 and a slot 28 is provided which extends throughout the entire length thereof and communicates with the opening 27. A rod 32 is screw-threaded into the casting 20 and extends centrally through the opening 27 on the housing 24.

An arm 29 has formed at one end a rounded head portion 29*a* which has a central opening 29*b* and a pin 30 extends through this opening 29*a* and the opening 17 in the offset portion 16. The head portion 29*a* is adapted to fit within the recess 16 so that the outer surface thereof is in the same plane as the outer surface of the flange 15*a*. The arm 29 is bent inwardly at right angles as indicated at 29*c* and is provided with a circular member 31.

The portion 29*a* is adapted to slide within the slot 28 and the circular member 31 is adapted to slide within the opening 27 of the housing 24. The arm 29 also extends through the slot 20*f*. This circular member 31 has a central opening 34 which receives the rod 32 and permits the same to slide therein.

A spring 35 is interposed between the circular member 31 and the casting 20 and is caused to contract when the door is opened.

The oven walls, which are not shown, are adapted to be applied in the usual manner and when so applied completely cover up the device and prevent the heat from coming in contact with it. This is due to the fact that the device is always within an air pocket between the walls of the stove and the walls of the oven.

In operating the device as the door 15 is opened the arm 29 being attached thereto and having the circular portion 31 formed thereon is caused to engage the spring 35 thereby contracting the same. This spring prevents the door 15 from banging open or accidentally flying open and as the door reaches its substantially horizontal position the bottom corner of the door 15 engages or abuts the surface 23 formed on the member 20 as indicated at 36 and prevents further open movement thereof.

When it is desired to close the door, it is raised slightly from the horizontal and the springs 35 are of sufficient tension to draw the door into closed position.

While I have described the preferred embodiment of my invention, it is to be understood that I am not to be limited to the specific construction contained herein but many changes may be made without departing from the spirit of the invention as contained in the appended claims.

Having thus described my invention, I claim:

1. In a door operating device for stoves and the like, the combination of a frame provided with an opening therein, a door pivoted to said frame and adapted to close said opening, a member secured to said frame upon the side opposite to said door and provided with a central opening, a spring in said latter opening, and an arm extending through said door opening having one end secured to said door and having the opposite end within said member opening and engaging said spring.

2. In a door operating device for stoves and the like, the combination of a frame provided with an opening therein, a door pivoted to said frame and adapted to close said opening, a member secured to said frame and provided with a central opening, said member being further provided with a slot communicating with said opening, resilient means within said opening, and an arm having one end pivotally attached to said door and having its opposite end engaging said resilient means, said arm being adapted to travel within said slot upon the door being opened or closed.

3. A door operating device for stoves and the like, comprising a member adapted to be rigidly secured to the frame of a stove and having a central opening therein, resilient means within said opening, and an arm having one end engaging said resilient means and the opposite end adapted to be secured to a door.

4. A door operating device for stoves and the like, comprising a member adapted to be rigidly secured to the frame of a stove and having a central opening therein, a spring within said opening, a rod screw-threaded into said member and extending centrally of said spring, and an arm having one end slidably engaging said rod and adapted to act against the tension of said spring and the opposite end provided with means adapted to be pivotally secured to a door.

5. A door operating device for stoves and the like, comprising a member adapted to be secured to the frame of a stove and provided with a central opening, said member being further provided with a slot communicating with said central opening, a spring within said opening, a rod extending centrally of said opening and said spring, and an arm having one end bent at substantially right angles to extend through said slot and formed with a head of substantially the same diameter as the opening in said member, said head being provided with an opening adapted to slidably engage said rod and the end of said spring and the opposite end adapted to engage a door.

6. In a door operating device for stoves and the like, the combination of a frame provided with an opening therein, a door pivoted to said frame and adapted to close said opening, members secured to the inner portion of the frame adjacent said door, resilient means in said members, and arms having one end engaging said resilient means and the opposite end pivotally attached to said door.

7. In a door operating device for stoves and the like, the combination of a frame provided with an opening therein, a flange extending into and substantially entirely surrounding said opening, the lower portion of one of the side flanges being cut away, a member secured to the frame and having a portion extending into said cut-away portion, said member being further provided with a tubular extension, a slot in the tubular extension extending longitudinally thereof, a spring within said tubular extension, and an arm having a portion extending through said slot into engagement with the end of the spring and having its opposite end extending through an opening in said member into pivotal engagement with said door.

8. In a door operating device for stoves and the like, the combination of a frame having outer walls and oven walls formed with a space between, said frame being provided with an opening therein, a door pivotally attached to said frame and adapted to close said opening, a member having a tubular extension, said member being attached to said frame and extending between the outer wall and the oven wall, resilient means in said tubular extension, and an arm having one end engaging the resilient means and the opposite end extending through the opening and pivotally engaging said door.

9. In a stop or check for stove doors and the like, a frame provided with an opening surrounded by a flange, the lower side portion of which is cut away, a member secured to the frame and having a portion extending into said cut-away portion, the lower end of said member being cut away to form a horizontal stop, and a door pivoted to said frame, the inner end of said door abutting said stop when in open position.

10. In a door operating device for stoves and the like, the combination of a frame provided with an opening therein, a door pivoted at the lower portion of the frame and adapted to close said opening, a member secured to the inner side of said frame, said member forming with said frame a bearing for said door, said member being further provided with a horizontally disposed tubular extension, a spring disposed within said tubular member, and an arm having one end in engagement with said spring and the opposite end extending forwardly into pivotal engagement with said door.

11. In a door operating device for stoves and the like, the combination of a frame provided with an opening, a door pivotally attached to the lower portion of said frame and adapted to close said opening, a member secured to the inner surface of the frame and adapted to cooperate with said frame to form a bearing for said door, said member being provided with a horizontal abutment adapted to be engaged by said door when in open position, a horizontally disposed tubular extension carried by said member and extending inwardly therefrom, a spring within said tubular member, and an arm having one end engaging said spring while the opposite end extends outwardly into pivotal engagement with said door.

12. In a stop or check for stove doors and the like, a frame provided with an opening, the lower portion of said frame being cut away to provide a recess, a door pivoted at the lower portion of the frame and adapted to close said opening, and a member positioned adjacent said recess and secured to the inner side of said frame and cooperating with the latter to form a bearing for said door, said member being cut away to provide a horizontal stop adapted to be engaged by the door when in opened position.

13. In a door operating device for stoves and the like, the combination of a frame provided with an opening therein, a door pivoted to said frame and adapted to close said opening, a member secured to the inner side of said frame and having portions cooperating with said frame to form a bearing for said door, an arm pivotally connected to said door and extending inwardly beyond said opening, and resilient means connected to said arm for maintaining said door in closed position.

14. A door construction for stoves and the like comprising a frame provided with an opening therein, a door adapted to close said opening, and means for pivotally supporting said door comprising split bearing portions and journal portions received therebetween, one of said portions being disposed to the rear of said frame whereby the outer surface of said stove is substantially free of protruding attaching members to thereby present a substantially plain outer surface and neat appearance.

15. In a door actuating device for stoves and the like, a frame provided with an opening therein, a door adapted to close said opening, means for pivotally supporting said door comprising split bearing portions and journal portions received therebetween, one of said portions being disposed to the rear of said frame whereby the outer surface of said stove is substantially free of protruding attaching members to thereby present a substantially plain outer surface, and means normally tending to move said door to its closed position.

16. In a door actuating device for stoves and the like, a frame provided with an opening therein, a door adapted to close said opening, and means for pivotally supporting said door comprising a depression in the rear portion of said frame adapted to form a part of a bearing for said door, and a member attached to the rear portion of said frame and adapted to form the cooperating part of the bearing for said door, and means normally tending to move said door to its closed position.

17. In a door actuating device for stoves and the like, a frame provided with an opening therein, a door adapted to close said opening, and means for pivotally supporting said door comprising a groove associated with the rear portion of said frame and extending axially of the door pivot and adapted to form a part of a bearing for said door, a member having a groove adapted to form the cooperating part of said bearing, and means normally tending to move said door to its closed position.

18. In a door actuating device for stoves and the like, a frame provided with an opening therein, a door adapted to close said opening, and means for pivotally supporting said door comprising a split bearing associated with the rear portion of said frame and having cooperating grooves in the respective faces adapted to pivotally support said door, means for limiting the opening of said door, and means normally tending to move said door to its closed position.

19. In a door actuating device for stoves and the like, a frame member provided with an opening therein, a door member adapted to close said opening, and means for pivotally supporting said door member comprising an extension on one of said members, a split bearing associated with the other of said members and having cooperating recesses in adjacent faces of said bearing adapted to receive said extension, said members further cooperating to thereby limit the opening of said door, and means normally tending to move said door to its closed position.

In testimony whereof, I hereunto affix my signature.

JEROME C. BOYLAN.